July 19, 1966

W. E. RUDNICKI 3,261,230

LOCKING DIFFERENTIAL TRANSMISSION

Filed Aug. 22, 1963

WILLIAM E. RUDNICKI
INVENTOR

BY John R. Faulkner
Donald J. Harrington
ATTORNEYS

WILLIAM E. RUDNICKI
INVENTOR

BY John R. Faulkner
Donald J. Harrington
ATTORNEYS

July 19, 1966 W. E. RUDNICKI 3,261,230
LOCKING DIFFERENTIAL TRANSMISSION
Filed Aug. 22, 1963 3 Sheets-Sheet 3

WILLIAM E. RUDNICKI
INVENTOR

BY John C. Faulkner
Donald J. Harrington
ATTORNEYS

United States Patent Office 3,261,230
Patented July 19, 1966

3,261,230
LOCKING DIFFERENTIAL TRANSMISSION
William Edward Rudnicki, Detroit, Mich., assignor to Ford Motor Company, Dearborn, Mich., a corporation of Delaware
Filed Aug. 22, 1963, Ser. No. 303,786
7 Claims. (Cl. 74—710.5)

My invention relates generally to friction torque establishing devices such as multiple disc clutches or brakes, and more particularly to a clutch or brake having engageable friction elements that are urged into frictional driving relationship by means of a spring.

I am aware of a variety of driveline installations for automotive vehicles and stationary powered machinery wherein the power flow path to a driven member of the driveline is defined by an engageable friction clutch having spring loaded friction discs. Under certain conditions it is desirable to allow the friction discs of such clutches to slip with respect to each other after a predetermined slip torque is developed. If torque delivery continues after a slipping condition is achieved, however, an excessive amount of heat due to friction will be developed, and this causes premature failure of the discs and other components of the clutch structure. It is an object of my invention, therefore, to avoid this overheating problem by providing a means for automatically reducing the power loss due to friction when a predetermined degree of slipping is obtained.

In a preferred embodiment of my invention, I have provided a right angle drive power differential mechanism comprising a driving bevel pinion and a bevel ring gear situated about transverse axes. The ring gear is carried by a differential carrier that supports a pair of differential pinion gears. These in turn mesh with separate differential side gears, one side gear being connected to one axle shaft and the other side gear being connected to another axle shaft. The axle shafts are aligned with respect to each other. Differential mechanisms of this general type currently are employed in automotive vehicle drivelines for delivering torque from an engine driven drive shaft to the axle shafts for the traction wheels.

The improved clutch assembly of my invention establishes a frictional driving connection between the differential carrier and one of the gear elements of the differential assembly. It includes friction discs that are carried by the gear element and the carrier and engaged frictionally by means of a Belleville spring. The clutching action of the clutch assembly thus resists differential action in the mechanism to provide a semi-positive drive for each traction wheel. It is possible, therefore, to establish a power flow path through the driveline to each traction wheel regardless of whether one wheel rests upon a surface having a relatively low coefficient of friction.

In an automotive vehicle driveline employing a differential mechanism of this type, it is possible to cause one wheel to spin with respect to the other if the other wheel is mired in mud or otherwise prevented from functioning. Although a driving torque will be delivered to each wheel by reason of the clutching action of the clutch assembly, the wheels will not be driven in unison if the tractive effort developed by one wheel greatly exceeds the corresponding tractive effort of the other. The friction elements of the clutch assembly then slip with respect to each other. If this condition continues, an excessive amount of heat will be developed and the discs will be destroyed.

It is an object of my invention, therefore, to prevent overheating of the discs in an assembly of this type by allowing the spring loaded discs to become unloaded automatically as heat due to friction is developed. I contemplate that after the heat has been dissipated following termination of the slipping, the clutch discs will be loaded again with a normal spring pressure thus restoring to the differential mechanism a semi-positive drive characteristic.

In an automotive vehicle employing a differential mechanism of this type, differential action occurs when the vehicle deviates from a straight ahead driving direction or when it maneuvers a turn. Normal slipping of the friction elements of the clutch assembly takes place to permit this differential action to occur. Under straight ahead driving conditions, however, no slipping of the friction elements occurs. It has been observed that when the axle and differential assembly is cold under starting conditions, an undesirable amount of chatter occurs in the friction discs as differentiation takes place. It is another object of my invention therefore to overcome this undesirable chatter problem by providing spring means with an appropriate spring rate characteristic for loading the friction discs.

It is a further object of my invention to provide a bimetallic Belleville spring arrangement in such a clutch construction and adapt it for yielding in response to an increase in the temperature developed by the friction discs thereby automatically unloading the discs to prevent excessive wear.

For the purpose of describing more particularly the improvements of my invention, reference will be made to the accompanying drawings wherein.

Figure 1:
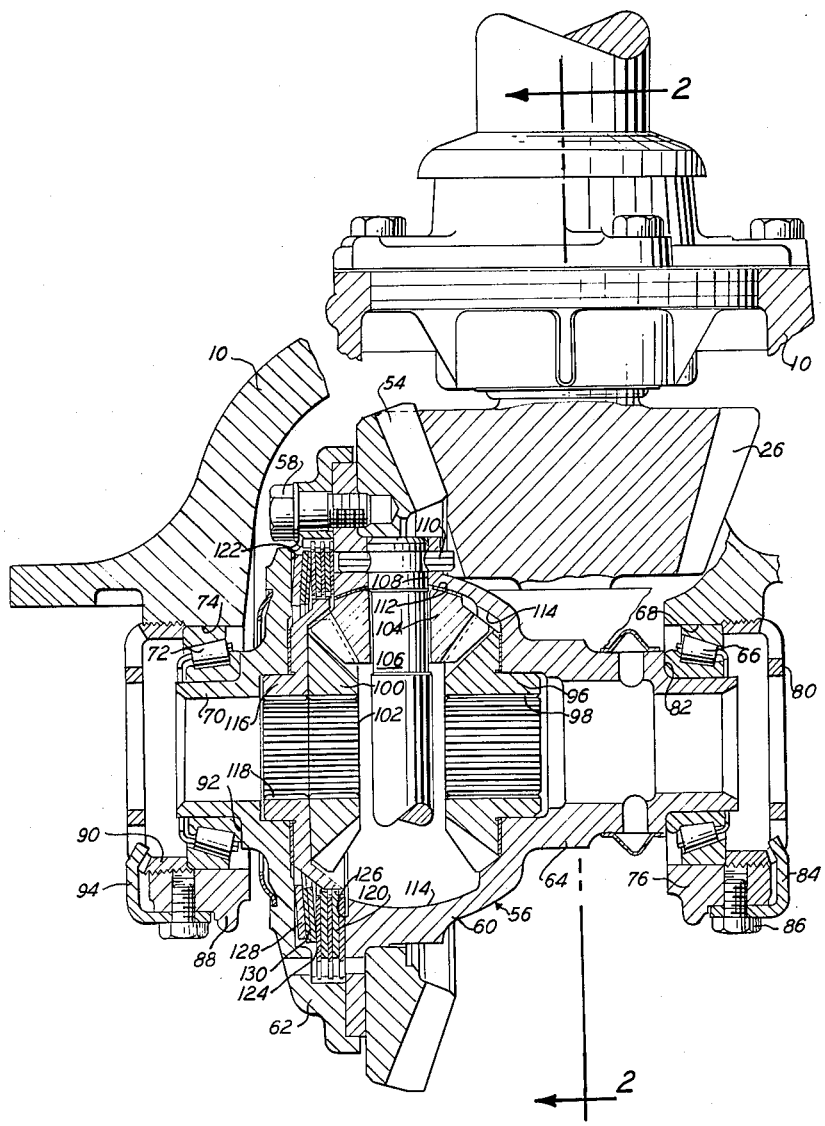
FIGURE 1 shows a transverse cross sectional view of a differential gear mechanism capable of being used in the driveline of an automotive vehicle.
Figure 2:
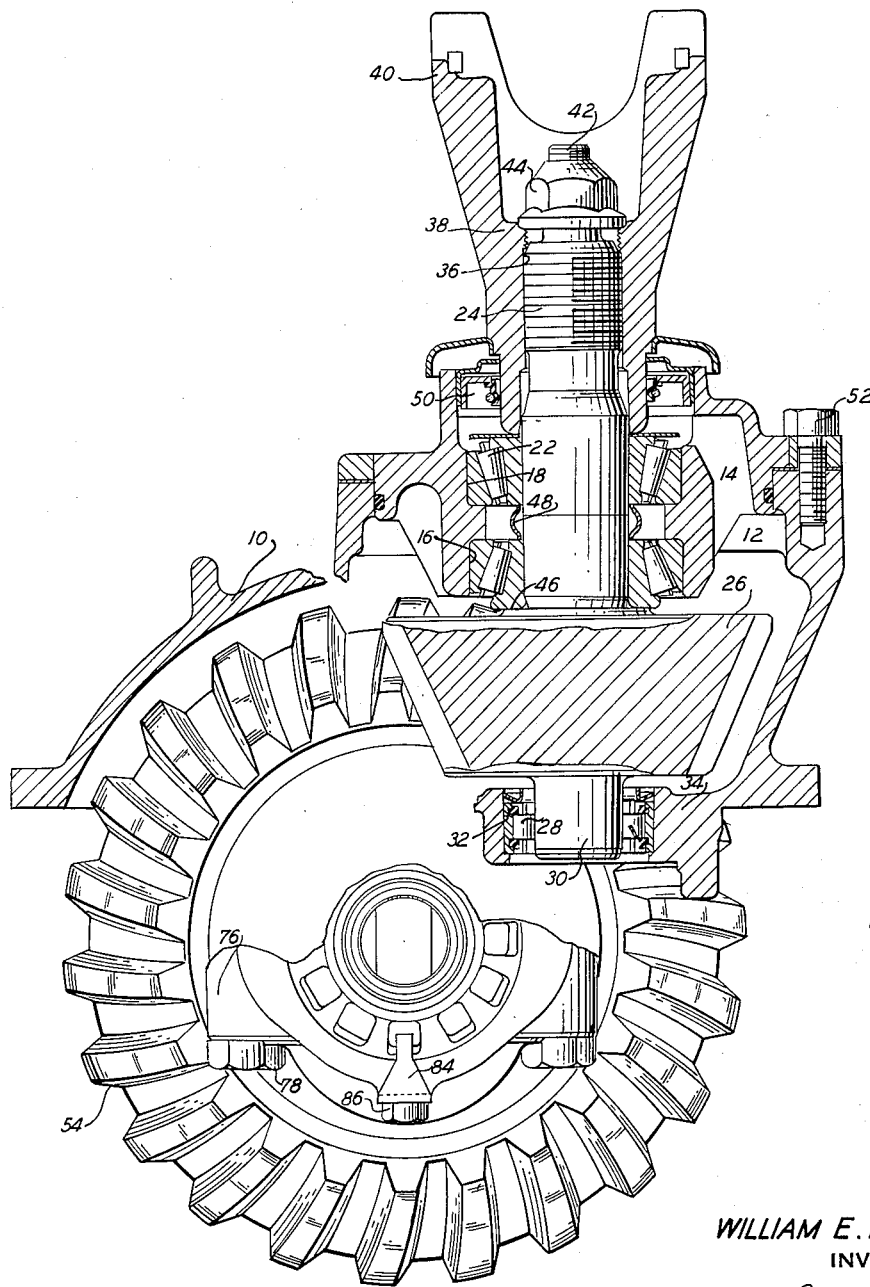
FIGURE 2 is a cross sectional view, partly in elevation, taken along the plane of section line 2—2 of FIGURE 1.

In FIGURES 1 and 2 of the drawings, numeral 10 designates the differential housing. It is formed with an opening 12 within which is received a bearing retainer 14. This retainer is formed with a pair of bearing openings 16 and 18 within which are situated tapered roller bearing assemblies 20 and 22, respectively. These bearing assemblies rotatably support a pinion shaft 24 which is received therethrough. The shaft 24 extends within the housing 10 and the inward end thereof carries a driving bevel pinion 26. The pinion 26 is straddle mounted by the bearing assemblies 20 and 22 and by a bearing assembly 28 which surrounds an extension 30 formed on the shaft 24. Bearing assembly 28 is received within a bearing opening 32 formed in a bearing support boss 34. This boss is cast integrally with the housing 10.

The outwardly extending end of shaft 24 is splined at 36 to an internally splined shaft 38. This shaft forms a portion of a yoke 40 for a universal joint. The drive shaft for the vehicle can be connected to the shaft 38 by means of a universal joint, not shown.

Shaft 24 is threaded at 42 to accommodate a clamping nut 44. The shaft 38 is formed with an internal shoulder that engages the nut as the latter is tightened.

The inner race of bearing assembly 20 engages a shoulder 46 formed on the pinion 26 so that the bearing assemblies 20 and 22 can be preloaded as the nut 44 is tightened. A deformable sleeve 48 is situated between the inner races of the bearing assemblies 20 and 22. The end of shaft 30 engages the inner race for the bearing assembly 22 and is surrounded by a fluid seal 50 which is received within a seal opening formed in the adapter 14. Suitable bolts 52 can be provided for securing the adapter 14 to the housing 10.

Pinion 26 is disposed in meshing engagement with a bevel ring gear 54. This gear surrounds the periphery of a differential carrier 56 and is connected thereto by bolts 58. Carrier 56 includes two carrier parts that are separately identified by reference characters 60 and 62. Part 60 includes an extension 64 which is journalled by means of a tapered roller bearing assembly 66 within a bearing opening 68 formed in the housing 10. In a similar fashion, carrier part 62 is formed with an extension 70 which is journalled by means of a tapered roller bearing assembly 72 within a bearing opening 74 formed in housing 10. The parts 60 and 62 are held together at their outer peripheries by the bolts 58.

The opening 68 is defined in part by a semi-circular recess formed in housing 10 and by a semi-circular bearing cap shown in FIGURE 2 at 76. This cap is bolted in place over the semi-circular opening in housing 10 by bolts 78 thereby defining a circular opening that receives the bearing assembly 66. This opening can be internally threaded to receive a spanner type nut 80. This nut is threaded within the opening 68 and engages the outer race for the bearing assembly 66. The inner race of the assembly 66 engages a shoulder 82 formed on the extension 64. The nut 80 is held in place by means of a tang 84 secured to the cap 76 by a retainer nut 86. The end of tang 84 is received within one of several openings in the nut 80.

A corresponding bearing cap 88 is provided for the extension 70. Another externally threaded spanner nut 90 is received within the opening 74 and engages the outer race of bearing assembly 72. The inner race of assembly 72 engages a shoulder 92 formed on the extension 70. A locking tang 94 also is provided for the nut 90.

A first differential side gear is shown at 96. It is internally splined at 98 to facilitate a splined connection with an axle shaft, not shown. A second differential side gear 100 is disposed also within the carrier 56 and is internally splined at 102 to facilitate a driving connection with a second axle shaft, not shown. Side gears 96 and 100 engage differential pinions 104 rotatably supported upon a pinion shaft 106. This shaft in turn is connected at each of its ends to the carrier part 60. The connection at each shaft end is established by an opening 108 through which the associated end of the shaft 106 extends. One end is formed with a groove that is engaged by a locking pin 110 which extends transversely through an opening that intersects the adjacent opening 108.

Pinions 104 are formed with a crowned bearing surface 112 which cooperates with a corresponding concave surface 114 formed in the carrier part 60. A crowned bushing can be provided between gear 104 and surface 114, as indicated.

Situated between side gear 100 and the carrier part 62 is a clutch element 116. It is internally splined at 118 to facilitate a splined connection with the axle shaft that extends through gear 100. Internally splined clutch discs 120 are carried by an externally splined periphery of the element 116.

Carrier part 62 is formed with a clutch chamber 122 having an internally splined outer periphery. Externally splined clutch discs 124 are connected to the internally splined periphery of the clutch chamber 122. They are situated in interdigital relationship with respect to the discs 120. A shoulder 126 is formed on carrier part 60 to provide a reaction means for the clutch disc assembly, the discs of which are urged into frictional engagement by a pair of Belleville springs shown at 128 and 130, respectively. The spring 128 can be made of steel and the spring 130 is bi-metallic. The convex surface of the spring 130 can be made of steel and the inner or concave portion thereof can be made of brass or nickel which have a higher coefficient of thermal expansion than that of steel. The brass or nickel portion and the steel portion can be bonded together to form a unitary Belleville spring having a shape corresponding approximately to the shape of Belleville spring 128.

The outer margin of spring 128 engages spring 130, and the outer margin of spring 130 in turn engages the clutch disc assembly. The inner margin of spring 128 engages the adjacent wall of the spring chamber 122 and the inner margin of spring 130 engages spring 128.

During operation of the differential mechanism under straight ahead driving conditions, relative motion will not take place between the discs 120 and 124. If the vehicle maneuvers a turn, however, differential action is established and the side gear 100 will move with respect to the carrier 56. This in turn will cause slipping of the clutch discs 120 and 124. Since the discs are loaded by the springs, the slipping motion of the clutch discs resists the differential action and a certain amount of heat then will be developed. The clutch discs will slip also if one traction wheel rests upon a slippery road surface such as ice while the other traction wheel rests upon a road surface of high traction. The slipping action of the discs will permit driving torque to be distributed to each wheel thereby making it possible to maneuver the vehicle. This slipping action, of course, also develops heat just as in the case of a differential action that occurs during a turning maneuver.

If the heat due to slipping of the clutch discs becomes excessive, the bi-metallic spring 130 will yield thereby reducing its concavity. This then reduces the load applied to the clutch disc assembly and prevents overheating and premature failure of the clutch discs.

After relative motion of the side gear 100 with respect to the carrier 56 ceases, the springs will be returned to the normal operating position thereby making it possible again to establish a semi-positive traction drive.

During operation under normal conditions, the heat that is developed by the clutch discs will be insufficient to cause release of the clutch pressure by the bi-metallic spring. It is only when the heat becomes excessive that the spring load becomes relieved.

Figure 3:
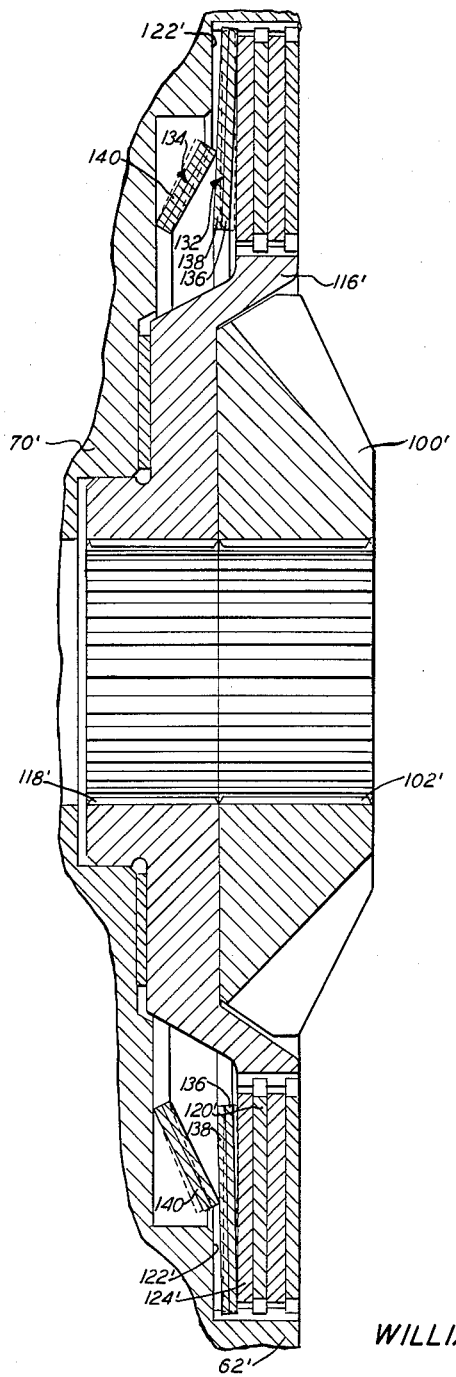
FIGURE 3 is a partial cross sectional view of a modified form of my invention.

In the embodiment of FIGURE 3 I have made provision for releasing clutch pressure when the ambient temperature falls below a calibrated mean value. This prevents chatter when differential action occurs under cold operating conditions.

The portions of the clutch structure of FIGURE 3 that have counterpart elements in the embodiment of FIGURES 1 and 2 have been designated by similar reference characters, although primed notations have been added. Unlike the embodiment of FIGURES 1 and 2, however, the embodiment of FIGURE 3 includes two bi-metallic Belleville springs that are identified by reference characters 132 and 134.

Spring 132 is anchored on its outer periphery against the splined portion of part 62′ within chamber 122′. Its normally convex surface is remotely positioned with respect to the discs 120′ and 124′.

A steel portion 136 of the disc 132 is adapted to engage the adjacent disc 124′. It is bonded to a portion 138 having a relatively high coefficient of thermal expansion. Thus when the ambient temperature increases, disc 132 will become less concave. Conversely, when the ambient temperature decreases, disc 132 will back away from the adjacent disc 124′ thereby reducing the tendency to chatter.

Clutch pressure normally is exerted upon the disc by the spring 134 which engages the mid portion of disc 132. This spring includes also a steel portion 140 and a portion 142 having a high thermal expansion characteristic. Thus when the temperature in chamber 122′ increases due to friction, disc 134 will become less concave and relieve clutch pressure thereby preventing overheating.

The cold position of spring 134 is shown by means of full lines and its hot position is shown by means of phantom lines. The cold and hot portions of spring 133 are similarly shown by means of full and phantom lines, respectively.

Having thus described a preferred embodiment of my invention, what I claim and desire to secure by U.S. Letters Patent is:

1. In a geared differential assembly having a power input shaft and two output shafts, gear elements forming a driving connection between said input shaft and each of said output shafts, a friction clutch assembly comprising a driving member connected to one gear element, a driven member connected to another gear element, a first friction clutch element carried by said driving member, a second friction clutch element carried by said driven member, and spring means for urging said friction clutch elements into clutching engagement, said spring means comprising an annular dished spring element, one periphery of said spring element being anchored and the other being adapted to apply a force to one of said clutch elements, said spring element comprising bi-metallic portions with one portion having a coefficient of thermal expansion that differs from the corresponding coefficient of the other portion whereby the spring force applied by said spring element is changed in response to a temperature build-up due to slipping of the clutch elements under load.

2. In a positive drive differential mechanism for an automotive vehicle, a differential carrier, a ring gear supported by said carrier, a driving pinion engageable with said ring gear and rotatable about an axis that is transverse to the axis of rotation of said ring gear, a pair of differential side gears in said carriers, differential pinions supported by said carrier in meshing engagement with said side gears, one side gear being adapted to be connected to one axle shaft and the other side gear being adapted to be connected to another axle shaft, a friction disc element carried by said carrier, another friction disc element being connected to one of said side gears, and a bi-metallic dished annular spring situated between said carrier and said disc for applying an actuating pressure to said disc elements, said spring having a first and second annular portions that are bonded together to form a unitary annular spring, one portion being formed of a metal that has a higher coefficient of expansion than the corresponding coefficient for the other portion whereby the pressure applied by said spring to said disc elements is reduced in response to a temperature build-up due to slipping of said disc elements under load.

3. In a geared differential assembly having a power input shaft and two output shafts, gear elements forming a driving connection between said input shaft and each of said output shafts, a friction clutch assembly comprising a driving member connected to one gear element, a driven member connected to another gear element, a first friction clutch element carried by said driving member, a second friction clutch element carried by said driven member, spring means for engaging said clutch elements comprising an annular dished spring element, one periphery of said spring element being engageable with one of said clutch elements and the other periphery being anchored, said spring element comprising bi-metallic portions with one portion having a coefficient of thermal expansion that differs from the corresponding coefficient of the other portion whereby the spring load applied by said spring element is reduced in response to a temperature build-up due to slipping of the clutch elements under load, and a second annular spring situated adjacent said bi-metallic annular spring element and engageable to supplement the spring force applied to said clutch elements.

4. In a positive drive differential mechanism for an automotive vehicle, a differential carrier, a ring gear supported by said carrier, a driving pinion engageable with said ring gear and rotatable about an axis that is transverse to the axis of rotation of said ring gear, a pair of differential side gears in said carrier, differential pinions supported by said carrier in meshing engagement with said side gears, one side gear being adapted to be connected to one axle shaft and the other side gear being adapted to be connected to another axle shaft, a friction disc element carried by said carrier, another friction disc element being connected to one of said side gears, a bi-metallic dished annular spring situated between said carrier and said discs for applying an actuating pressure to said discs, said spring having first and second annular portions that are bonded together to form a unity annular spring, one portion being formed of a metal that has a higher coefficient of expansion than the corresponding coefficient of expansion for the other portion whereby the pressure applied by said spring to said disc elements is reduced in response to a temperature build-up due to slipping of said disc elements under load, and a second annular spring situated adjacent said bi-metallic annular spring and engageable therewith to supplement the spring force applied to said disc elements.

5. In a geared differential assembly having a power input shaft and two output shafts, gear elements forming a driving connection between said input shaft and each of said output shafts, a friction clutch assembly comprising a driving member connected to one gear element, a driven member connected to another gear element, a first friction clutch element carried by said driving member, a second friction clutch element carried by said driven member, spring means for engaging said clutch elements comprising a first bi-metallic dished spring element having one portion thereof anchored against one of said members, a second bi-metallic spring element disposed adjacent said first spring element and adapted to be engaged by another portion of said first spring element, said second spring element being engageable with one of said clutch elements and having a portion thereof anchored against said one member, said second spring element being adapted to move toward said clutch elements and said other portion of said first spring element being adapted to move away from said clutch elements upon an increase in the operating temperature of the clutch assembly.

6. The combination as set forth in claim 5 wherein said spring elements are in the form of annular, dished springs, the outer periphery of said second spring element being anchored and the inner periphery of said first spring element being anchored.

7. The combination as set forth in claim 6 wherein said other portion of said first spring element is adapted to engage said second spring element at a location situated between its inner and outer peripheries.

References Cited by the Examiner

UNITED STATES PATENTS

| | | | |
|---|---|---|---|
| 1,750,981 | 3/1930 | Wildhaber | 74—711 |
| 2,519,865 | 8/1950 | Wellman | 192—107 |
| 2,921,659 | 1/1960 | Gutmann | 192—107 |
| 2,991,664 | 7/1961 | Bernotas | 74—711 |

FOREIGN PATENTS

| | | |
|---|---|---|
| 1,330,857 | 5/1962 | France. |
| 1,236,945 | 6/1960 | France. |

DAVID J. WILLIAMOWSKY, *Primary Examiner.*

DON A. WAITE, *Examiner.*

J. A. WONG, *Assistant Examiner.*